US010148214B2

(12) United States Patent
Tanaka et al.

(10) Patent No.: US 10,148,214 B2
(45) Date of Patent: Dec. 4, 2018

(54) MOTOR CONTROL DEVICE HAVING MULTIPLE POWER FAILURE DETECTION SENSITIVITIES

(71) Applicant: FANUC CORPORATION, Yamanashi (JP)

(72) Inventors: Shunpei Tanaka, Yamanashi (JP); Kenta Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/466,994

(22) Filed: Mar. 23, 2017

(65) Prior Publication Data

US 2017/0310268 A1    Oct. 26, 2017

(30) Foreign Application Priority Data

Apr. 25, 2016    (JP) .................................. 2016-087379

(51) Int. Cl.
*H02P 29/00*    (2016.01)
*H02P 29/024*    (2016.01)
(Continued)

(52) U.S. Cl.
CPC .............. *H02P 29/025* (2013.01); *H02P 6/14* (2013.01); *H02P 27/08* (2013.01)

(58) Field of Classification Search
CPC .... H02P 29/024; H02P 1/029; H02P 29/0243; H02P 8/36; H02P 29/025; H02H 7/08; H02H 3/13; H02H 3/253
See application file for complete search history.

(56) References Cited

U.S. PATENT DOCUMENTS

2003/0052544 A1* 3/2003 Yamamoto ................ B66B 5/02
307/66
2011/0182398 A1* 7/2011 Iwashita ................ G01R 31/42
377/19
(Continued)

FOREIGN PATENT DOCUMENTS

CN    105450145 A    3/2016
JP    2006151545 A    6/2006
(Continued)

OTHER PUBLICATIONS

English Abstract and Machine Translation for (US 20120098475 A1) Japanese Publication No. 5283752 B2, published Sep. 4, 2013, 18 pgs.
(Continued)

*Primary Examiner* — Bickey Dhakal
(74) *Attorney, Agent, or Firm* — Fredrikson & Byron, P.A.

(57) ABSTRACT

A motor control device includes: a rectifier that converts AC power supplied from an AC power supply side into DC power and outputs the DC power; an inverter that converts the DC power output from the rectifier into AC power for motor driving and outputs the AC power; an AC voltage detection unit that detects an AC voltage value of an AC power supply side of the rectifier; and a power failure detection unit that outputs, based on the AC voltage value detected by the AC voltage detection unit, several power failure detection signals in accordance with a predetermined power failure detection condition at a power failure on the AC power supply side of the rectifier.

3 Claims, 6 Drawing Sheets

(51) Int. Cl.
*H02P 6/14* (2016.01)
*H02P 27/08* (2006.01)

(56) References Cited

U.S. PATENT DOCUMENTS

| | | | | |
|---|---|---|---|---|
| 2012/0098475 A1* | 4/2012 | Noguchi | ............... | H02P 29/025 |
| | | | | 318/479 |
| 2013/0134910 A1* | 5/2013 | Iwashita | ............... | H02P 3/14 |
| | | | | 318/376 |

FOREIGN PATENT DOCUMENTS

| | | | |
|---|---|---|---|
| JP | 2011155803 | A | 8/2011 |
| JP | 2011209936 | A | 10/2011 |
| JP | 5283752 | B2 | 9/2013 |
| JP | 2015232838 | A | 12/2015 |

OTHER PUBLICATIONS

English Abstract for Japanese Publication No. 2011-209936 A, published Oct. 20, 2011, 1 pg.
English Abstract and Machine Translation for Japanese Publication No. 2015-232838 A, published Dec. 24, 2015, 11 pgs.
English Abstract and Machine Translation for Japanese Publication No. 2011-155803 A, published Aug. 11, 2011, 8 pgs.
English Abstract and Machine Translation for Japanese Publication No. 2006-151545 A, published Jun. 15, 2006, 8 pgs.
English Abstract and Machine Translation for Chinese Publication No. 105450145 A, published Mar. 30, 2016, 9 pgs.

* cited by examiner

MOTOR CONTROL DEVICE HAVING MULTIPLE POWER FAILURE DETECTION SENSITIVITIES

BACKGROUND OF THE INVENTION

1. Field of the Invention

The present invention relates to a motor control device that converts AC power supplied from an AC power supply side into DC power and outputs the DC power to a DC link, and thereafter further converts the DC power into AC power for motor driving and supplies the AC power to a motor, and in particular, relates to a motor control device including a power failure detection unit that detects a power failure on an AC power supply side.

2. Description of the Related Art

A motor control device that drives a motor inside a machine tool, a forging press, an injection molding machine, an industrial machine, or a robot of various types once converts, at a rectifier, AC power supplied from an AC power supply side into DC power, thereafter further converts, at an inverter, the DC power into AC power, and uses the AC power as power for driving a motor provided in each drive axis.

In such a motor control device, when a power failure occurs on an AC power supply side of a rectifier, supply of AC power from the AC power supply side to the rectifier stops, as a result, a DC link voltage between the rectifier and an inverter drops, which prevents the inverter from outputting AC power for driving a motor, and accordingly, the motor is unable to continue normal operation, which may cause a failure, such as damage and deformation in the motor, the motor control device for driving the motor, a tool connected to the motor driven by the motor control device, an object to be machined by the tool, a manufacturing line including the motor control device, and the like (hereinafter, simply referred to as "the motor control device and the peripheral devices thereof").

Thus, as described in, for example, Japanese Unexamined Patent Publication (Kokai) No. 2011-209936, a power failure detection unit is generally provided on the AC power supply side of the rectifier to monitor whether a power failure occurs on the AC power supply side of the rectifier, and when the power failure detection unit determines that a power failure occurs on the AC power supply side of the rectifier, the motor control device performs a protective operation for avoiding or minimizing the failure and thereafter stops the motor.

In addition, as described in, for example, Japanese Examined Patent Publication (Kokoku) No. 5283752, a motor driving device is provided with a selection circuit for switching a power failure detection threshold value depending on whether regeneration is ignorable or non-ignorable, and executes abnormal end processing (protective operation) at a power failure without being affected by an installation environment.

Generally, a power failure detection unit is configured to output a power failure detection signal indicating the occurrence of a power failure when a state in which (the amplitude of) an AC voltage value detected by an AC voltage detection unit lies below a power failure voltage threshold value continues for a power failure time threshold value or more. The amount of energy needed to continue normal operation of a motor control device and peripheral devices thereof at a power failure on an AC power supply side of a rectifier is referred to as, for example, "power failure tolerance" and for performing a protective operation at a power failure, the power failure needs to be detected in accordance with a device having the smallest "power failure tolerance". On the other hand, even a device having small power failure tolerance may be able to continue normal operation by including a backup power supply. However, in a conventional system that starts the protective operation uniformly when the power failure detection signal is output by the power failure detection unit, there is a problem that a motor stops with increased frequency despite the provision of a backup power supply and this leads to reduction in a machine operation rate. FIG. 6 is a diagram illustrating the relationship between the occurrence of a power failure on an AC power supply side of a rectifier and the power failure detection signal output by a power failure detection unit in a conventional motor control device. In FIG. 6, a state of the AC voltage value of the AC power supply side of the rectifier during normal time is represented as "High", and a state of the AC voltage value of the AC power supply side of the rectifier at a power failure is represented as "Low". In addition, as one example, a state of the power failure detection signal being output from the power failure detection unit is represented as "High" and a state of the power failure detection signal not being output from the power failure detection unit is represented as "Low". For example, when assuming that the power failure detection unit outputs the power failure detection signal for both a short-time power failure (momentary power failure) and a long-time power failure on the AC power supply side of the rectifier and the protective operation is always started in response to the output, the power failure detection signal is output even for a power failure of such a short time that a motor can continue operating through the backup of a control power supply by using another power supply and thus the protective operation is executed to stop the motor, which results in the reduction in a machine operation rate.

SUMMARY OF INVENTION

Therefore, it is desired to provide a motor control device that is able to maximally continue normal operation at a power failure on an AC power supply side and is able to minimally suppress the execution of a protective operation.

According to one aspect of the present disclosure, a motor control device includes: a rectifier that converts AC power supplied from an AC power supply side into DC power and outputs the DC power; an inverter that converts the DC power output from the rectifier into AC power for motor driving and outputs the AC power; an AC voltage detection unit that detects an AC voltage value of an AC power supply side of the rectifier; and a power failure detection unit that outputs, based on the AC voltage value detected by the AC voltage detection unit, several power failure detection signals in accordance with a predetermined power failure detection condition at a power failure on the AC power supply side of the rectifier.

Herein, the power failure detection condition may include a power failure voltage threshold value and a power failure time threshold value, and the power failure detection unit generates several power failure detection signals when a state in which the AC voltage value detected by the AC voltage detection unit lies below the power failure voltage threshold value continues for the power failure time threshold value or more.

Further, the power failure detection unit may generate and output, based on the AC voltage value detected by the AC voltage detection unit, several power failure detection signals in accordance with a plurality of the power failure detection conditions in which at least one of the power failure voltage threshold value and the power failure time threshold value is different.

Further, the power failure detection unit may include at least one delay transmission unit that temporally delays at least one of the power failure detection signals generated, based on the AC voltage value detected by the AC voltage detection unit, in accordance with the power failure detection condition and transmits the delayed power failure detection signal, and output, as the power failure detection signals, the power failure detection signals generated by the power failure detection unit and a power failure detection signal transmitted via the at least one delay transmission unit.

Further, a process of controlling, based on at least one of the power failure detection signals, the inverter to output power for a motor to perform a predetermined protective operation may be started, and a power maintenance operation for turning on, based on at least another one of the power failure detection signals, a backup power supply for control for use in controlling the rectifier and the inverter may be started.

Further, the power failure voltage threshold value and the power failure time threshold value may be set and modified.

Further, the delay time in the power failure detection signal by the delay transmission unit may be set and modified.

BRIEF DESCRIPTION OF THE DRAWINGS

The present invention will be more clearly understood with reference to the following accompanying drawings.

DETAILED DESCRIPTION

Figure 1:
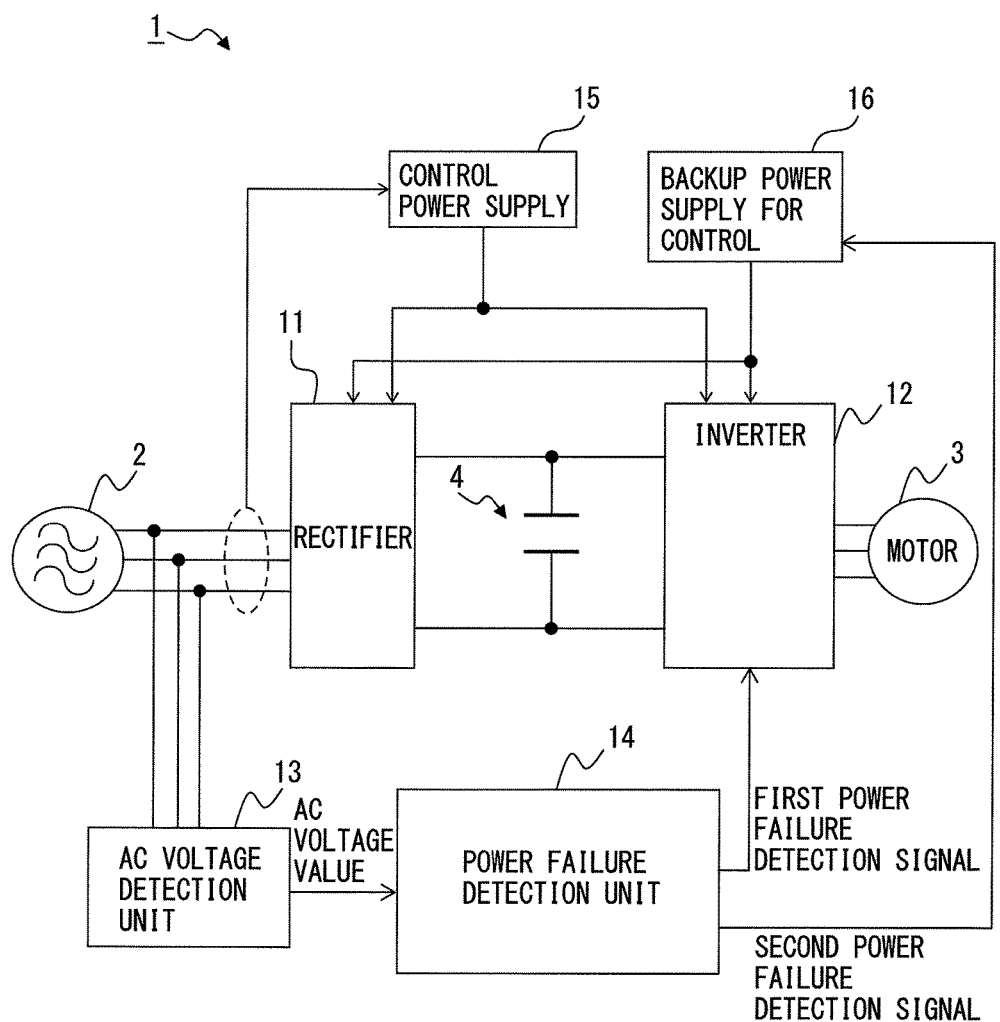
FIG. 1 is a diagram illustrating the configuration of a motor control device according to a first embodiment of the present disclosure.

According to one aspect of the present disclosure, a motor control device includes: a rectifier that converts AC power supplied from an AC power supply side into DC power and outputs the DC power; an inverter that converts the DC power output from the rectifier into AC power for motor driving and outputs the AC power; an AC voltage detection unit that detects an AC voltage value of an AC power supply side of the rectifier; and a power failure detection unit that outputs, based on the AC voltage value detected by the AC voltage detection unit, several power failure detection signals at a power failure on the AC power supply side of the rectifier. For example, processing of controlling, based on at least one of the power failure detection signals, the inverter to output power for a motor to perform a predetermined protective operation is started, and a power maintenance operation for turning on, based on at least another One of the power failure detection signals, a backup power supply for control for use in controlling the rectifier and the inverter is started. Hereinafter, the configuration will be specifically described with reference to the drawings in first and second embodiments. In the following drawings, the same components are assigned with the same reference signs. For easy understanding, the scales of the drawings have been properly changed. In addition, forms illustrated in the drawings are examples for carrying out the present disclosure, and the present disclosure is not limited to the illustrated forms.

FIG. 1 is a diagram illustrating the configuration of a motor control device according to the first embodiment of the present disclosure. To a commercial AC input side of the motor control device 1, an AC power supply 2 is connected, and to an AC motor side of the motor control device 1, an AC motor 3 is connected. A description is given herein of the motor control device 1 drive-controlling the single motor 3, but the number of the motors 3 drive-controlled by the motor control device 1 is not to particularly limit the present embodiment. In addition, the type of the motor 3 drived by the motor control device 1 is not to particularly limit the present embodiment, but may be, for example, an induction motor or a synchronous motor.

As illustrated in FIG. 1, the motor control device 1 according to the first embodiment of the present disclosure includes a rectifier 11, an inverter 12, an AC voltage detection unit 13, and a power failure detection unit 14.

The rectifier 11 converts AC power supplied from the AC power supply 2 side into DC power, and outputs the DC power to a DC link on a DC side. The rectifier 11 to be used is not limited to a particular embodiment, but may be, for example, a diode rectifier or a PWM control rectifier internally including a semiconductor switching element. When the rectifier 11 is a PWM control rectifier, the rectifier 11 is constituted of a bridge circuit including semiconductor switching elements and diodes connected in inverse-parallel with the semiconductor switching elements. In this case, examples of the semiconductor switching element include an IGBT, a thyristor, a GTO (Gate Turn-OFF thyristor), and a transistor, but the type itself of the semiconductor switching element is not to limit the present embodiment and may be another type of the semiconductor switching element.

To the DC link connecting the DC output side of the rectifier 11 and the DC input side of the inverter 12, a smoothing capacitor (also referred to as a DC link capacitor) 4 is provided. The smoothing capacitor 4 includes a function of suppressing a pulsation component of DC output from the rectifier 11 and a function of accumulating DC power.

The inverter 12 converts DC power output from the rectifier 11 into AC power for driving the motor 3, and outputs the AC power. The inverter 12 is constituted of, for example, a bridge circuit including semiconductor switching elements and diodes connected in inverse-parallel with the semiconductor switching elements, such as a PWM inverter. In this case, examples of the semiconductor switching element include an IGBT, a thyristor, a GTO, and a transistor, but the type itself of the semiconductor switching element is not to limit the present embodiment but may be another type of the semiconductor switching element. In addition, the inverter 12 causes the internal switching element to perform switching operation based on a motor driving instruction received from a host controller (not illustrated), and converts DC power supplied from the rectifier 11 via the DC link into AC power of a desired voltage and a desired frequency for driving the motor 3. Consequently, the motor 3 operates based on the supplied voltage-variable and frequency-variable AC power.

A control voltage for driving the rectifier 11 and the inverter 12 is supplied by a control power supply 15. The control power supply 15 rectifies, at a rectifier different from the rectifier 11, an AC voltage supplied from, for example, the commercial AC power supply 2 to be lowered to a control voltage level (for example, 24 [V]), and supplies the AC voltage, as the control voltage, to the rectifier 11 and the inverter 12. Although the control power supply 15 is able to supply the control voltage to the rectifier 11 and the inverter 12 during normal time (non-power failure time), the control power supply 15 is unable to supply the control voltage at a power failure on the AC power supply side. Thus, a backup power supply for control 16 is provided as a power supply separate from the control power supply 15. In other words, in the first embodiment of the present disclosure, although a DC voltage obtained by rectifying an AC voltage supplied from the AC power supply 2 is used as the control voltage for driving the rectifier 11 and the inverter 12 during normal time (non-power failure time), a supply source of the control voltage for driving the rectifier 11 and the inverter 12 is switched from the control power supply 15 to the backup power supply for control 16 at a power failure. Hereinafter, an operation of switching the control voltage from the control power supply 15 to the backup power supply for control 16 at a power failure will be referred to as a "power maintenance operation".

The backup power supply for control 16 is constituted of, for example, an uninterruptible power supply. As an alternative example of this, the DC power-accumulated smoothing capacitor 4 may be applied for the backup power supply for control 16 at a power failure. The control of the power maintenance operation may be performed by, for example, a control unit (not illustrated) attached to the backup power supply for control 16, or alternatively, may be performed by a host controller (not illustrated).

The AC voltage detection unit 13 detects an AC voltage value of the AC power supply side of the rectifier 11. In the present embodiment, examples of a method of detecting an AC voltage include a method in which a three-phase to two-phase conversion is applied to an AC voltage on a three-phase coordinate of the AC power supply side of the rectifier 11 and a thus-obtained vector norm on a two-phase coordinate is determined as the AC voltage value, and a method in which a voltage crest value of an AC voltage on a three-phase coordinate of the AC power supply side of the rectifier 11 is determined as the AC voltage value. The AC voltage value detected by the AC voltage detection unit 13 is sent to the power failure detection unit 14.

The power failure detection unit 14 outputs, at a power failure on the AC power supply side of the rectifier 11, power failure detection signals based on the AC voltage value detected by the AC voltage detection unit 13. A more specific description is given as follows.

A power failure detection condition includes a power failure voltage threshold value that is a power failure determination criterion for the AC voltage value of the AC power supply side of the motor control device 1, and a power failure time threshold value that is the duration during which the AC voltage value of the AC power supply side of the motor control device 1 lies below the power failure voltage threshold value. The power failure detection unit 14 generates, in accordance with the predetermined power failure detection condition, a power failure detection signal when a state in which the AC voltage value detected by the AC voltage detection unit 13 lies below the power failure voltage threshold value continues for the power failure time threshold value or more.

In the first embodiment of the present disclosure, several power failure detection signals are generated and output in accordance with power failure detection conditions. More specifically, a first power failure detection signal and a second power failure detection signal are generated respectively in accordance with power failure detection conditions (of two types in the illustrated example) in which at least one of the power failure voltage threshold value and the power failure time threshold value is different. In other words, among the power failure detection conditions, only the power failure time threshold value is different, only the power failure voltage threshold value is different, or both the power failure voltage threshold value and the power failure time threshold value are different.

Figure 2:
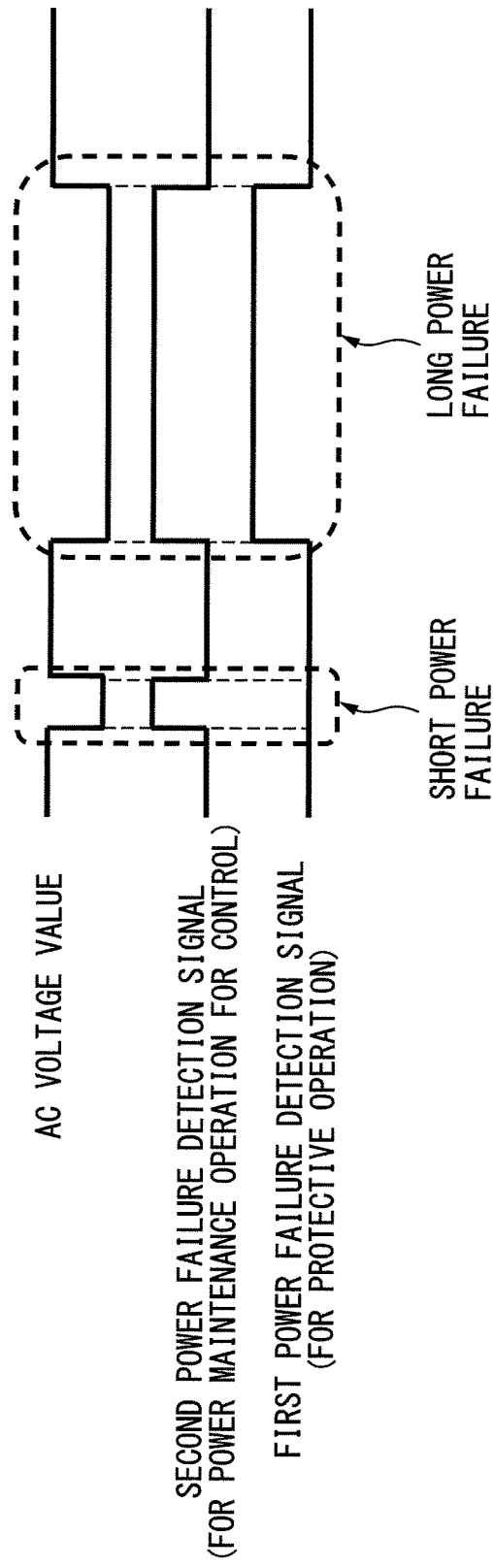
FIG. 2 is a diagram illustrating the difference between power failure detection signals output at a power failure under different power failure detection conditions.
Figure 6:
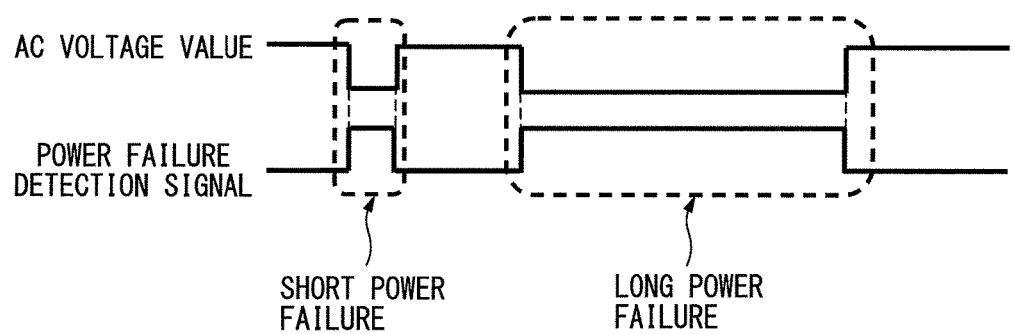
FIG. 6 is a diagram illustrating the relationship between the occurrence of a power failure on an AC power supply side of a rectifier and the power failure detection signal output by a power failure detection unit in a conventional motor control device.

FIG. 2 is a diagram illustrating the difference between power failure detection signals output at a power failure under different power failure detection conditions. In FIG. 2, similarly to FIG. 6, a state of the AC voltage value of the AC power supply side of the rectifier 11 during normal time is represented as "High", and a state of the AC voltage value of the AC power supply side of the rectifier 11 at a power failure is represented as "Low". In addition, each of the power failure detection signals to be generated respectively in accordance with the power failure detection conditions is represented as "High" when being output, and as "Low" when being not output.

When a power failure occurs, since an input of AC power from the AC power supply side to the rectifier 11 stops or decreases, the rectifier 11 outputs no DC power or insufficient DC power. Thus, a protective operation for avoiding a failure in the motor control device 1 and the peripheral devices thereof is performed by using DC power accumulated in the smoothing capacitor 4 as a driving source. In the first embodiment of the present disclosure, the power failure detection unit 14 generates a first power failure detection signal as a signal triggering the start of the protective operation. When receiving the first power failure detection signal indicating the occurrence of a power failure, the inverter 12 causes the internal switching element to perform switching operation, converts DC power accumulated in the smoothing capacitor 4 into AC power needed to perform various protective operations for protecting the motor control device 1 and the peripheral devices thereof, and outputs the AC power.

On the other hand, the power failure detection unit 14 generates a second power failure detection signal as a signal triggering the start of a power maintenance operation on the backup power supply for control 16 (i.e., an operation of switching the control voltage of the rectifier 11 and the inverter 12 from the control power supply 15 to the backup power supply for control 16).

In the first embodiment of the present disclosure, in order not to generate the first power failure detection signal for a short-time power failure for which the protective operation is not needed (i.e., in order not to switch the first power failure detection signal from "Low" to "High"), a power failure detection sensitivity dependent on a power failure detection condition for use in generation of the first power failure detection signal is set to be lower than a power failure detection sensitivity dependent on a power failure detection condition for use in generation of the second power failure detection signal. For example, a power failure detection sensitivity for use in generation of the first power failure detection signal is set to be lower than a power failure detection sensitivity for use in generation of the second power failure detection signal by setting a power failure time threshold value that is a power failure detection condition for use in generation of the first power failure detection signal to be longer (larger) than a power failure time threshold value that is a power failure detection condition for use in generation of the second power failure detection signal. When the power failure detection unit 14 is operated after setting power failure detection conditions (power failure time threshold values) in this manner, the power failure detection unit 14 outputs all or at least a part of power failure detection signals at a power failure on the AC power supply side of the rectifier 11. The power failure detection sensitivity varies depending on the setting of the power failure detection condition, and as a result, whether the power failure detection unit 14 outputs a power failure detection signal at a power failure on the AC power supply side of the rectifier 11 varies as well.

For example, as illustrated in FIG. 2, when a short-time power failure occurs on the AC power supply side of the rectifier 11, it is not determined that a power failure occurs under the power failure detection condition for use in generation of the first power failure detection signal, and the first power failure detection signal for the protective operation start is not generated (i.e., the first power failure detection signal is not switched from "Low" to "High"), whereas it is determined that a power failure occurs under the power failure detection condition for use in generation of the second power failure detection signal, and the second power failure detection signal for the power maintenance operation is generated (i.e., the second power failure detection signal is switched from "Low" to "High"). Hence, when a short-time power failure occurs, the protective operation is not executed but the power maintenance operation is executed. On the other hand, when a long-time power failure occurs on the AC power supply side, it is determined that a power failure occurs under both the power failure detection condition for use in generation of the first power failure detection signal and the power failure detection condition for use in generation of the second power failure detection signal, and both the first power failure detection signal and the second power failure detection signal are generated (i.e., both the first power failure detection signal and the second power failure detection signal are switched from "Low" to "High"). Hence, when a long-time power failure occurs, both the protective operation and the power maintenance operation are executed.

In the above, a description has been given about when only the power failure time threshold value is different between the power failure detection condition for use in generation of the first power failure detection signal and the power failure detection condition for use in generation of the second power failure detection signal, but only the power failure voltage threshold value or both the power failure time threshold value and the power failure voltage threshold value may be different between the power failure detection condition for use in generation of the first power failure detection signal and the power failure detection condition for use in generation of the second power failure detection signal. Since the smaller the power failure voltage threshold value is, the lower the power failure detection sensitivity is, in order to set the power failure detection sensitivity dependent on the power failure detection condition for use in generation of the first power failure detection signal to be lower than the power failure detection sensitivity dependent on the power failure detection condition for use in generation of the second power failure detection signal, the power failure voltage threshold value that is the power failure detection condition for use in generation of the first power failure detection signal may be set to be smaller than the power failure voltage threshold value that is the power failure detection condition for use in generation of the second power failure detection signal. Alternatively, the power failure voltage threshold value and the power failure time threshold value that are the power failure detection condition for use in generation of the first power failure detection signal may be set to be smaller and longer than the power failure voltage threshold value and the power failure time threshold value that are the power failure detection condition for use in generation of the second power failure detection signal. The power failure voltage threshold value and the power failure time threshold value can be set and modified, and these threshold values are stored, in a rewritable manner, in a shared storage area (not illustrated) provided in the power failure detection unit 14. Upon operation of the motor control device 1, the power failure detection unit 14 acquires the power failure detection condition from the storage area.

The first power failure detection signal for the protective operation start generated at the power failure detection unit 14 is sent to the inverter 12. When receiving the first power failure detection signal, the inverter 12 converts DC power accumulated in the smoothing capacitor 4 into AC power needed to perform various protective operations for protecting the motor control device 1 and the peripheral devices thereof and outputs the AC power. On the other hand, the second power failure detection signal for the power maintenance operation generated at the power failure detection unit 14 is sent to the backup power supply for control 16, and is used as a signal triggering the start of the power maintenance operation on the backup power supply for control 16. In the example illustrated in FIG. 1, since the control of the power maintenance operation is assumed to be performed by a control unit (not illustrated) attached to the backup power supply for control 16, the second power failure detection signal generated at the power failure detection unit 14 is assumed to be sent to the backup power supply for control 16. As a modification example, when the control of the power maintenance operation is performed at the inverter 12 or a host controller, the second power failure detection signal may be sent to the inverter 12 or the host controller.

Figure 3:
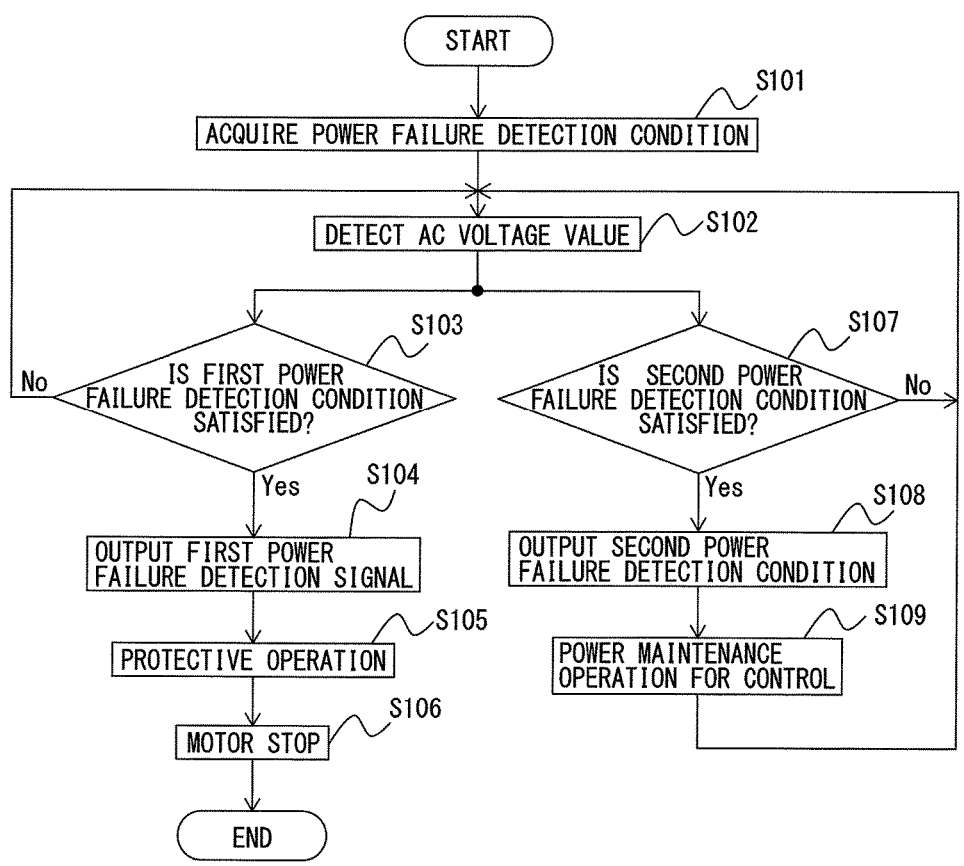
FIG. 3 is a flowchart illustrating an operation flow at a power failure in the motor control device according to the first embodiment of the present disclosure.

FIG. 3 is a flowchart illustrating an operation flow at a power failure in the motor control device according to the first embodiment of the present disclosure.

In a state in which the motor control device 1 is driving the motor 3, at Step S101, the power failure detection unit 14 acquires a power failure detection condition from the storage area.

At Step S102, the AC voltage detection unit 13 detects an AC voltage value of the AC power supply side of the rectifier 11. The AC voltage value detected by the AC voltage detection unit 13 is sent to the power failure detection unit 14, and Steps S103 and S107 are executed.

At Step S103 following Step S102, the power failure detection unit 14 determines whether the AC voltage value detected by the AC voltage detection unit 13 satisfies a first power failure detection condition. The power failure detection unit 14 determines that the first power failure detection condition, which includes a power failure voltage threshold value and a power failure time threshold value, is satisfied when a state in which the AC voltage value detected by the AC voltage detection unit 13 lies below the power failure voltage threshold value continues for the power failure time threshold value or more. When it is determined that the first power failure detection condition is not satisfied, the processing returns to Step S102. When it is determined that the first power failure detection condition is satisfied, the processing proceeds to Step S104.

At Step S104, since a first power failure determination condition that "a state in which the AC voltage value detected by the AC voltage detection unit 13 lies below the power failure voltage threshold value continues for the power failure time threshold value or more" is satisfied, the power failure detection unit 14 generates a first power failure detection signal for protective operation start and outputs the first power failure detection signal to the inverter 12.

At Step S105, the inverter 12 converts DC power accumulated in the smoothing capacitor 4 into AC power needed to perform various protective operations for protecting the motor control device 1 and the peripheral devices thereof and outputs the AC power. Consequently, the protective operation is performed on the motor control device 1 and the peripheral devices thereof, and thereafter the motor 3 stops (Step S106).

On the other hand, at Step S107 following Step S102, the power failure detection unit 14 determines whether the AC voltage value detected by the AC voltage detection unit 13 satisfies a second power failure detection condition. The power failure detection unit 14 determines that the second power failure detection condition, which includes a power failure voltage threshold value and a power failure time threshold value, is satisfied when a state in which the AC voltage value detected by the AC voltage detection unit 13 lies below the power failure voltage threshold value continues for the power failure time threshold value or more. When it is determined that the second power failure detection condition is not satisfied, the processing returns to Step S102. When it is determined that the second power failure detection condition is satisfied, the processing proceeds to Step S108.

At Step S108, since a second power failure determination condition that "a state in which the AC voltage value detected by the AC voltage detection unit 13 lies below the power failure voltage threshold value continues for the power failure time threshold value or more" is satisfied, the power failure detection unit 14 generates a second power failure detection signal for power maintenance operation and outputs the second power failure detection signal to the backup power supply for control 16. Consequently, the backup power supply for control 16 executes a power maintenance operation (Step S109).

As has been described above, in the first embodiment of the present disclosure, the motor control device is provided with the power failure detection unit that generates several power failure detection signals in accordance with power failure detection conditions. Then, by setting a power failure detection sensitivity for use in generation of the power failure detection signal triggering the start of the protective operation to be lower than a power failure detection sensitivity for use in generation of the power failure detection signal triggering the start of the power maintenance operation, execution of the protective operation is minimally suppressed and the normal operation is maximally continued as well. For example, a power failure of such a short time that a motor can continue operation through the backup of a control power supply by using another power supply can be treated as not undergoing execution of the protective operation.

Next, a second embodiment of the present disclosure will be described with reference to FIGS. 4 and 5. In the first embodiment described above, the power failure detection unit having power failure detection conditions is provided in order that the power failure detection unit may output several power failure detection signals, whereas in the second embodiment of the present disclosure, at least one delay transmission unit is provided that generates several power failure detection signals in accordance with a single power failure detection condition, temporally delays at least one of the generated power failure detection signals, and transmits the delayed power failure detection signal.

Figure 4:
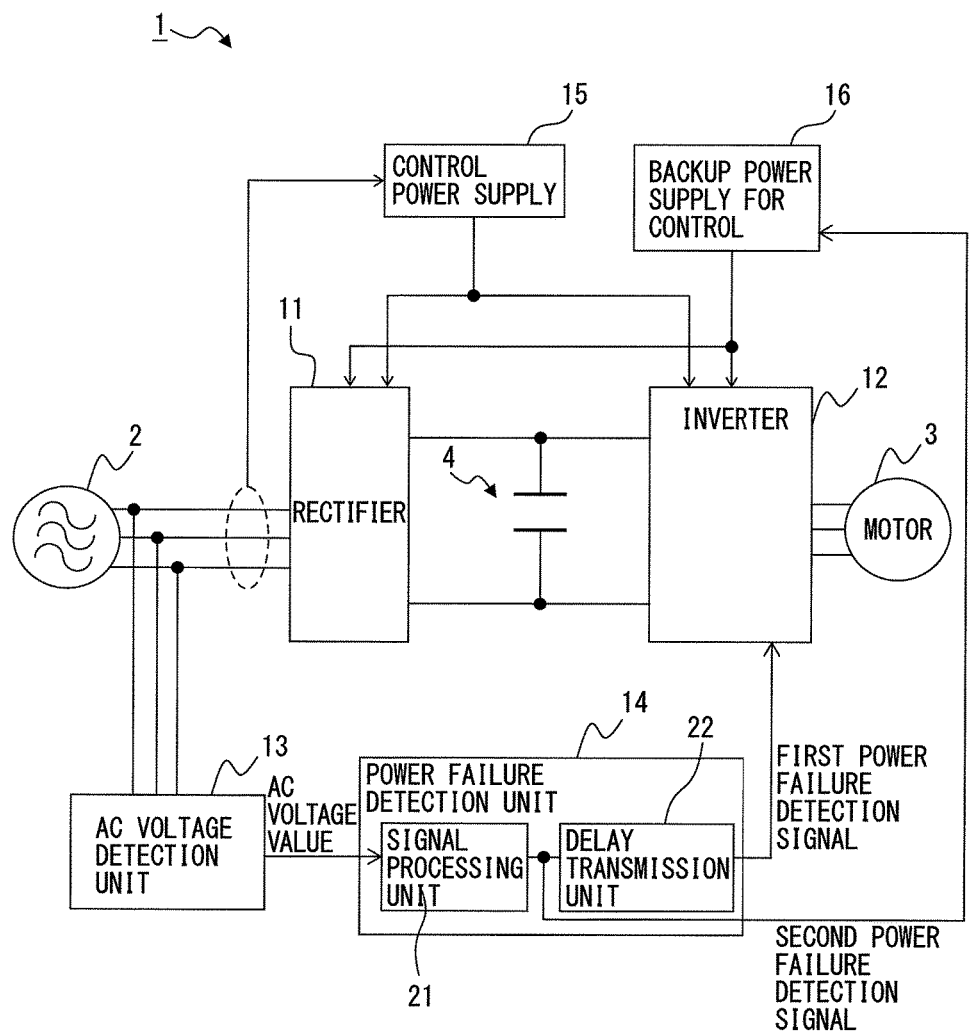
FIG. 4 is a diagram illustrating the configuration of a motor control device according to a second embodiment of the present disclosure.

FIG. 4 is a diagram illustrating the configuration of a motor control device according to the second embodiment of the present disclosure. In the second embodiment of the present disclosure, a power failure detection unit 14 includes a signal processing unit 21 that generates, based on an AC voltage value detected by an AC voltage detection unit 13, a power failure detection signal in accordance with a predetermined power failure detection condition, and at least one delay transmission unit 22 that temporally delays the power failure detection signal generated by the signal processing unit 21 and transmits the delayed power failure detection signal. In the example illustrated in FIG. 4, the number of single delay transmission unit 22 is assumed to be one. With the configuration as described above, the power failure detection unit 14 outputs, as the above-mentioned several power failure detection signals, a second power failure detection signal generated by the signal processing unit 21 and a first power failure detection signal obtained by delaying the second power failure detection signal at the delay transmission unit 22. The a delay time in the power failure detection signal by the delay transmission unit 22 may be set and modified, and a parameter defining the delay time is stored, in a rewritable manner, in a storage area (not illustrated) provided in the power failure detection unit 14. Other components are the same as the components illustrated in FIG. 1, thus, the same components are assigned with the same reference signs, and detailed description for the components will be omitted.

Figure 5:
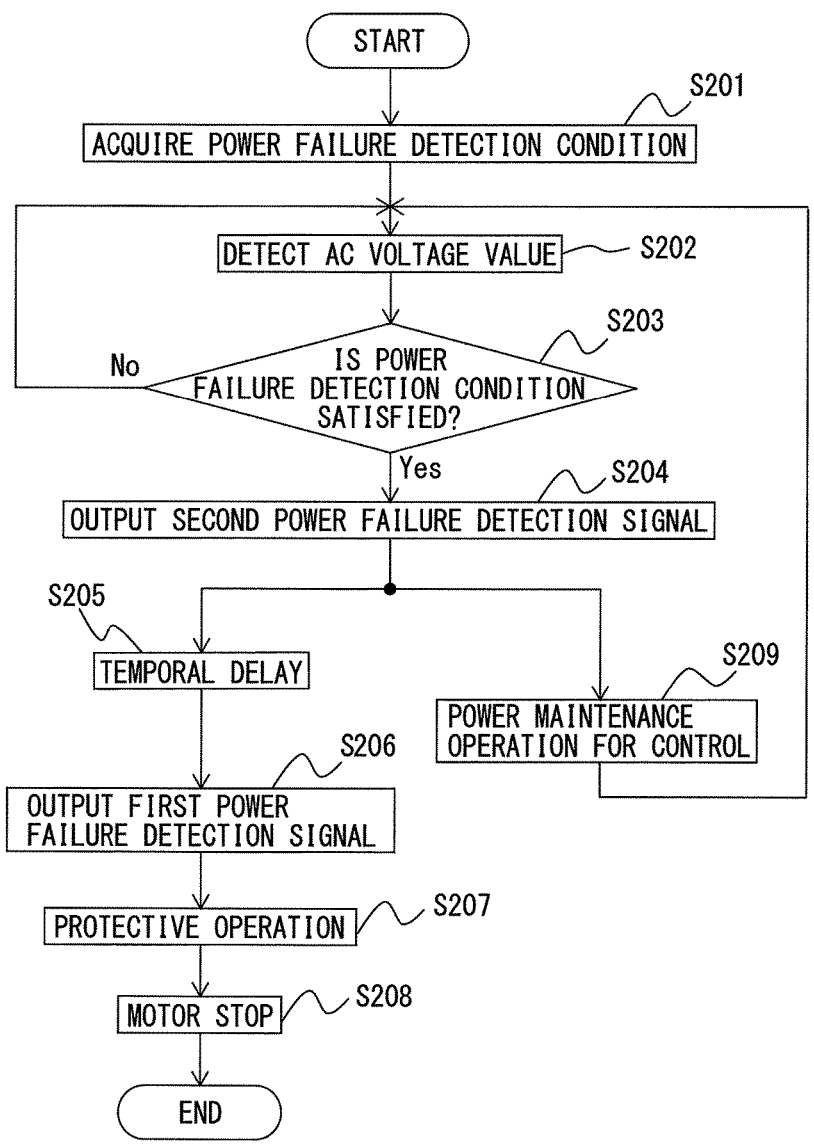
FIG. 5 is a flowchart illustrating an operation flow at a power failure in the motor control device according to the second embodiment of the present disclosure.

FIG. 5 is a flowchart illustrating an operation flow at a power failure in the motor control device according to the second embodiment of the present disclosure. In a state in which the motor control device 1 is driving the motor 3, at Step S201, the signal processing unit 21 in the power failure detection unit 14 acquires a power failure detection condition from the storage area.

At Step S202, the AC voltage detection unit 13 detects an AC voltage value of the AC power supply side of the rectifier 11. The AC voltage value detected by the AC voltage detection unit 13 is sent to the power failure detection unit 14.

At Step S203, the signal processing unit 21 in the power failure detection unit 14 determines whether the AC voltage value detected by the AC voltage detection unit 13 satisfies the power failure detection condition. The signal processing unit 21 in the power failure detection unit 14 determines that the power failure detection condition, which includes a power failure voltage threshold value and a power failure time threshold value, is satisfied when a state in which the AC voltage value detected by the AC voltage detection unit 13 lies below the power failure voltage threshold value continues for the power failure time threshold value or more. When it is determined that the power failure detection condition is not satisfied, the processing returns to Step S202. When it is determined that the power failure detection condition is satisfied, the processing proceeds to Step S204.

At Step S204, since a power failure determination condition that "a state in which the AC voltage value detected by the AC voltage detection unit 13 lies below the power failure voltage threshold value continues for the power failure time threshold value or more" is satisfied, the signal processing unit 21 in the power failure detection unit 14 generates a second power failure detection signal and outputs the second power failure detection signal to the delay transmission unit 22 and the backup power supply for control 16, and the processing proceeds to Steps S205 and S209.

At Step S205 following Step S204, the delay transmission unit 22 in the power failure detection unit 14 delays the second power failure detection signal generated by the signal processing unit 21 by a set delay time.

At Step S206, the delay transmission unit 22 outputs the delayed signal, as a first power failure detection signal, to the inverter 12.

At Step S207, the inverter 12 converts DC power accumulated in the smoothing capacitor 4 into AC power needed to perform various protective operations for protecting the motor control device 1 and the peripheral devices thereof and outputs the AC power. Consequently, the protective operation is performed on the motor control device 1 and the peripheral devices thereof, and thereafter the motor 3 stops (Step S208).

On the other hand, at Step S209 following Step S204, the backup power supply for control 16 executes a power maintenance operation based on the second power failure detection signal received from the signal processing unit 21 in the power failure detection unit 14.

As has been described above, at a power failure on the AC power supply side of the rectifier, the power failure detection unit outputs several power failure detection signals based on an AC voltage value detected by the AC voltage detection unit. In the first and second embodiments described above, two types of power failure detection signals are separately used for a signal triggering the start of a protective operation and a signal triggering the start of a power maintenance operation on the backup power supply for control. When there are motors drive-controlled by the motor control device, power failure detection signals can be transmitted respectively to inverters provided corresponding to the motors and a protective operation and a power maintenance operation can be performed individually for each set of a motor and an inverter, in the same manner as in the first embodiment and the second embodiment described above.

According to one aspect of the present disclosure, a motor control device can be implemented that is able to maximally continue the normal operation at a power failure on an AC power supply side and is able to minimally suppress the execution of the protective operation.

According to one aspect of the present disclosure, a power failure detection unit is able to output several power failure detection signals at a power failure on an AC power supply side of a rectifier. A motor control device can be implemented that is able to continue normal operation as much as possible and is able to minimize execution of a protective operation by separately using the several power failure detection signals for a signal triggering the start of a protective operation and a signal triggering the start of a power maintenance operation on a backup power supply for control. For example, a power failure of such a short time that a motor can continue operation through the backup of a control power supply by using another power supply can be treated as not undergoing execution of the protective operation.

What is claimed is:

1. A motor control device comprising:
a rectifier that converts AC power supplied from an AC power supply side into DC power and outputs the DC power;
an inverter that converts the DC power output from the rectifier into AC power for motor driving and outputs the AC power;
an AC voltage detection unit that detects an AC voltage value of an AC power supply side of the rectifier; and
a power failure detection unit that outputs, based on the AC voltage value detected by the AC voltage detection unit, several respective power failure detection signals in accordance with a respective predetermined power failure detection condition at a power failure on the AC power supply side of the rectifier, wherein
the power failure detection condition includes a power failure voltage threshold value and a power failure time threshold value, and
the power failure detection unit generates several power failure detection signals when a state in which the AC voltage value detected by the AC voltage detection unit lies below the power failure voltage threshold value continues for the power failure time threshold value or more, wherein
the power failure detection unit further
includes at least one delay transmission unit that temporally delays at least one of the power failure detection signals generated, based on the AC voltage value detected by the AC voltage detection unit, in accordance with the power failure detection condition and transmits the delayed power failure detection signal, and outputs, as the power failure detection signals, the power failure detection signals generated by the power failure detection unit and a power failure detection signal transmitted via the at least one delay transmission unit.

2. The motor control device according to claim 1, wherein the power failure detection unit generates and outputs, based on the AC voltage value detected by the AC voltage detection unit, several power failure detection signals in accordance with a plurality of the power failure detection conditions in which at least one of the power failure voltage threshold value and the power failure time threshold value is different.

3. The motor control device according to claim 1, wherein a process of controlling, based on at least one of the power failure detection signals, the inverter to output power for a motor to perform a predetermined protective operation is started, and a power maintenance operation for turning on, based on at least another one of the power failure detection signals, a backup power supply for control for use in controlling the rectifier and the inverter is started.

* * * * *